US012044257B2

(12) United States Patent
Kranda et al.

(10) Patent No.: US 12,044,257 B2
(45) Date of Patent: Jul. 23, 2024

(54) APPARATUS AND METHOD OF FLUID POWERED LINEAR ACTUATORS WITH ADJUSTABLE STOPS

(71) Applicant: Sullivan, Higgins, and Brion Power Plant Engineering, LLC, Mobile, AL (US)

(72) Inventors: Michael J. Kranda, Portland, OR (US); Daniel R Higgins, Tigard, OR (US)

(73) Assignee: Sullivan, Higgins, and Brion PPE, LLC, Mobile, AL (US)

( * ) Notice: Subject to any disclaimer, the term of this patent is extended or adjusted under 35 U.S.C. 154(b) by 0 days.

(21) Appl. No.: 18/246,485

(22) PCT Filed: Nov. 1, 2021

(86) PCT No.: PCT/US2021/057602

§ 371 (c)(1),
(2) Date: Mar. 23, 2023

(87) PCT Pub. No.: WO2022/067275

PCT Pub. Date: Mar. 31, 2022

(65) Prior Publication Data

US 2023/0392618 A1 Dec. 7, 2023

Related U.S. Application Data

(60) Provisional application No. 63/083,860, filed on Sep. 25, 2020.

(51) Int. Cl.
*F15B 15/24* (2006.01)
*F15B 15/16* (2006.01)

(52) U.S. Cl.
CPC .............. *F15B 15/24* (2013.01); *F15B 15/16* (2013.01)

(58) Field of Classification Search
CPC ... F15B 15/16; F15B 15/24; F15B 2015/1495
See application file for complete search history.

(56) References Cited

U.S. PATENT DOCUMENTS 2,556,979 A * 6/1951 Purcell .................... F15B 15/24 91/437
3,092,082 A * 6/1963 Geyer ..................... F15B 15/24 92/33
3,407,710 A * 10/1968 Weiss ...................... B30B 15/18 92/13.8

(Continued)

FOREIGN PATENT DOCUMENTS

| | | |
|---|---|---|
| DE | 2516866 A1 | 9/1976 |
| GB | 1525369 A | 9/1978 |
| GB | 2264538 A | 9/1993 |

*Primary Examiner* — Thomas E Lazo
(74) *Attorney, Agent, or Firm* — Michael Scheinberg; Scheinberg & Associates, PC

(57) ABSTRACT

A pneumatic linear actuator with a manually adjustable stop mechanism integrated into the device such that the actuator mechanism and the stop mechanism are co-linear. The stop mechanism limits the travel of the actuator by turning a handwheel. The mechanisms are completely sealed and/or enclosed and a gear-reduction position indicator is included. Forward and reverse acting variations are presented.

15 Claims, 6 Drawing Sheets

SECTION A-A

(56) References Cited

U.S. PATENT DOCUMENTS

| | | | | |
|---|---|---|---|---|
| 3,815,480 | A * | 6/1974 | Spyra | F03C 1/00 92/13.8 |
| 3,951,042 | A * | 4/1976 | Weiss | F15B 15/24 91/363 R |
| 4,822,428 | A | 4/1989 | Goodspeed | |
| 5,307,745 | A | 5/1994 | Higgins et al. | |
| 6,347,573 | B1 | 2/2002 | Henkel et al. | |
| 7,926,412 | B2 * | 4/2011 | Kristoff | F15B 15/14 92/113 |
| 2017/0102013 | A1 | 4/2017 | Wallman et al. | |

* cited by examiner

SECTION A-A

SECTION B-B
SCALE 1/2

APPARATUS AND METHOD OF FLUID POWERED LINEAR ACTUATORS WITH ADJUSTABLE STOPS

TECHNICAL FIELD OF THE INVENTION

The present invention relates generally to the field of fluid power prime movers, more specifically to adjustable linear actuators.

BACKGROUND OF THE INVENTION

Fluid-powered linear actuators are in widespread use worldwide, either pneumatically or hydraulically actuated. They most commonly consist of a cylindrical cylinder with matching piston connected to a coaxial rod extending from one or both ends. Heads are fitted in both ends of the cylinder with the rod or rods passing through one or both heads. Reciprocating seals are fitted between the piston and the cylinder and between the rod(s) and head(s) and static seals are fitted between the heads and the cylinder. The seals can take many forms as can the attachment methods between the heads and cylinder to withstand the pressure of the operating medium. Compressed air is the most commonly used medium to actuate the device, but other media can be used including inert gases and hydraulic liquids. To operate the device one side of the piston is exposed to higher media pressure than the other side causing the piston and rod to move toward the lower pressure side. The rod or rods are typically connected to and operate an external mechanism.

Many forms of pneumatic linear actuators exist including those with non-round cross sections and so-called rod-less cylinders. In many applications it is advantageous to control the travel length, or stroke, of the rod. For example, the present invention was developed to operate air flow control dampers on industrial boilers. In that application, a damper means movably covers a port opening that supplies air to a boiler. The damper position is adjusted manually by an operator to control air flow to the boiler, but the damper is periodically opened automatically to facilitate cleaning the opening by an associated automatic port cleaner. U.S. Pat. No. 4,822,428 to Goodspeed for an "Apparatus for Cleaning Air Ports of a Chemical Recovery Furnace" and U.S. Pat. No. 5,307,745 to Higgins et al. for a "Removable Damper for Chemical Recovery Furnace" are representative of such devices. In the device described in U.S. Pat. No. 5,307,745, a pneumatic linear actuator (air cylinder) is integrated into a mechanism that controls the stroke length of the actuator by means of an externally adjusted stop, that is, the stop mechanism is external to the cylinder. This is advantageous in that it uses an off-the-shelf actuator, but the stop mechanism is exposed to the harsh boiler environment and difficult to protect effectively, is overly large, and ungainly in appearance. Many different variations of these actuators have been developed, all with external stop mechanisms and all suffering from the same drawbacks. All of these actuators fail prematurely or require significant periodic maintenance when exposed to harsh environments.

SUMMARY OF THE INVENTION

An object of the invention is to provide a method and apparatus for an improved adjustable linear actuator.

A linear actuator includes a manually adjustable stop mechanism. In some embodiments, the actuator mechanism and the stop mechanism are co-linear. The stop mechanism limits the travel of the actuator, for example, by turning a handwheel. The mechanisms are completely sealed and/or enclosed. In some embodiments, a gear-reduction position indicator is included.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention relate generally to the field of fluid power prime movers, more specifically to linear actuators, and more specifically still to pneumatic cylinders. Embodiments can also be used as position controllers and valve and damper actuators. The mechanism by which the extension and/or retraction of the actuator is adjusted is referred to as the adjustable stop mechanism. Some embodiments address the deficiencies of the prior art by integrating the adjustable stop mechanism internally to the actuator thereby providing an inherently sealed design that is much more robust and requires much less maintenance than prior art adjustable actuators.

The features of one embodiment are best described by referencing associated FIGS. 1-6. In the following description, the handwheel end is considered proximate and the cylinder rod end is considered distal, also, the end from which the rod protrudes from the cylinder is considered the nose and the opposite end is the tail.

Figure 1:
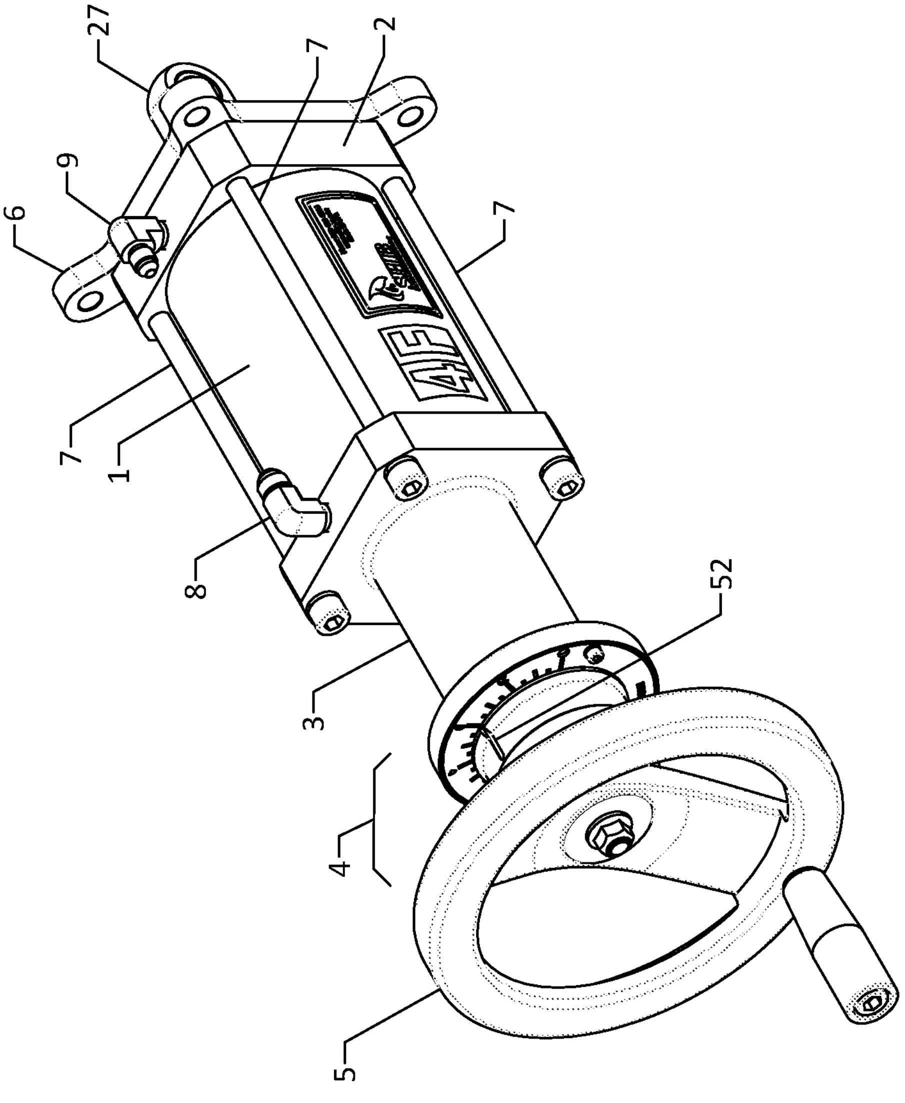
FIG. 1 is a three dimensional exterior view of the invention.
Figure 2:
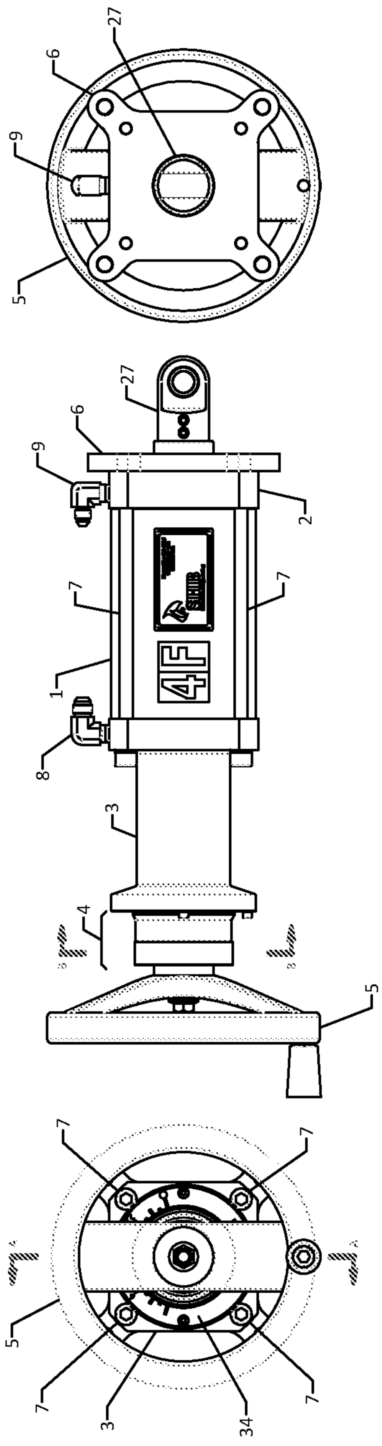
FIG. 2 shows side and end views with section line identifiers

Referring to FIGS. 1 and 2, several features can be identified for general reference on the exterior of the invention including cylinder 1, cylinder nose 2, cylinder tail 3, position indicator 4, handwheel 5, mounting plate 6, tie-screws 7, tail fitting 8, and nose fitting 9. "Cylinder" is used in the general sense to mean any housing which mates with a piston that moves within the housing and "cylinder" is not limited to geometrically cylinder housings. For example, the cylinder can have an elliptical or rectangular cross section.

Figure 3:
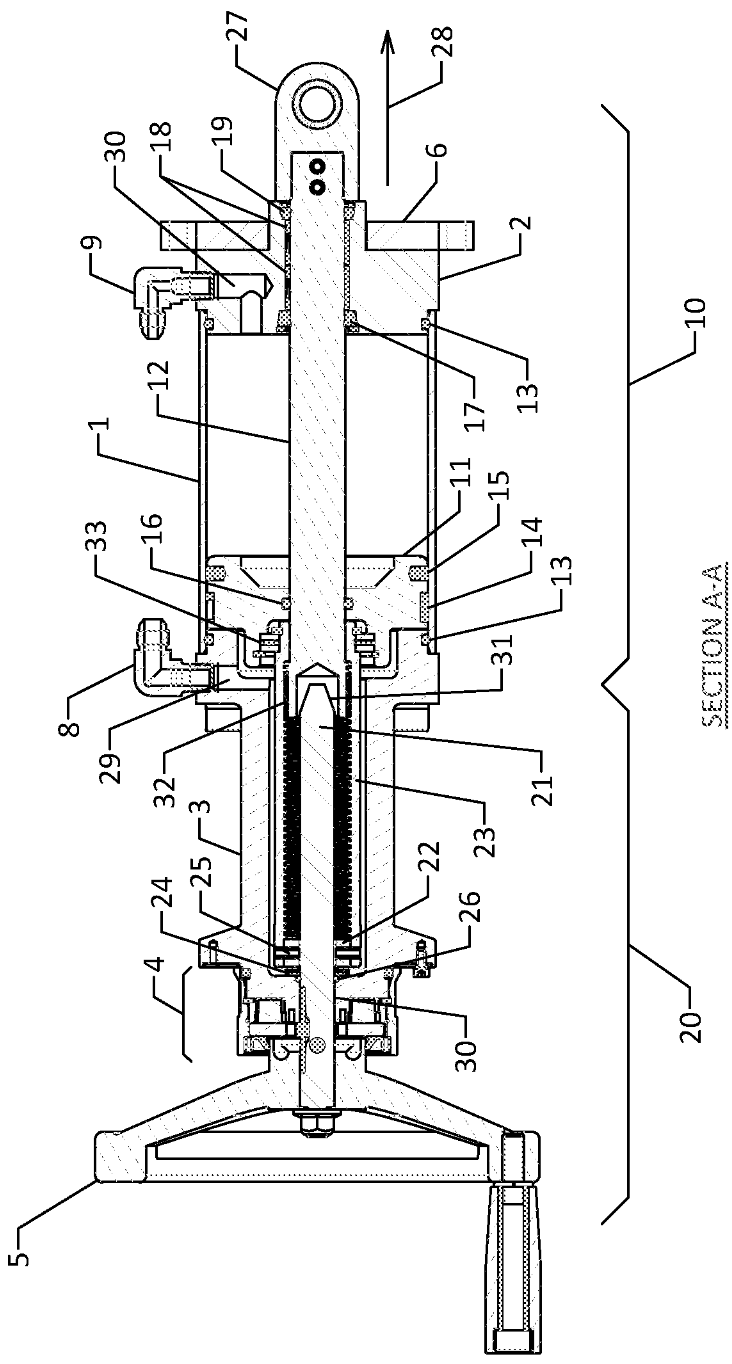
FIG. 3 is a longitudinal cross section of a first embodiment at Section A-A

Cylinder nose 2 and cylinder tail 3 are concentrically stepped to engage opposite ends of cylinder 1 and tie-screws 7 draw cylinder nose 2 and cylinder tail 3 toward each other and resist the outward forces when the cylinder is pressurized. Referring now to FIG. 3, the first embodiment is of a forward acting linear actuator with integrated adjustable stop mechanism employing compressed air as the fluid medium. Other fluid media, such as an inert gas, other gas, or hydraulic liquid can be used. Pneumatic cylinder portion 10 is comprised of cylinder 1, piston 11, cylinder rod 12, cylinder nose 2, cylinder tail 3, barrel seals 13, piston bearing 14, piston barrel seal 15, piston rod seal 16, rod nose seal 17, nose bearings 18, and rod scraper 19, all arranged in a coaxial relationship.

Cylinder tail 3 incorporates the housing for adjusting mechanism 20 and journal means for position indicator 4. Adjusting mechanism 20 is comprised of handwheel 5, input shaft 21, internal nut 22, a tube having female ACME threads, referred to as ACME tube 23, thrust bearing 24, radial pins 25, and input shaft seal 26, all in coaxial alignment with each other and with pneumatic cylinder portion 48, except radial pins 25.

In FIG. 3, cylinder rod 12 is shown in the fully retracted position with cylinder rod end 27 tightly against cylinder nose 2. In the forward acting embodiment, the position of piston 11 relative to cylinder rod 12 is adjusted such that the length of extension stroke 28 is controlled. To extend cylinder rod 12, compressed air flows in through tail fitting 8 and extension port 29 pressurizing the tail side of piston 11 causing piston 11 to move toward cylinder nose 2 and exhaust air flows out of retraction port 30 and nose fitting 9. If piston 11 starts in the location shown in FIG. 3, cylinder rod 12 will travel the full distance allowed by the length of cylinder 1 until piston 11 contacts cylinder nose 2.

Handwheel 5 is torsionally fixed to input shaft 21 such that when handwheel 5 is rotated input shaft 21 likewise rotates. Input shaft 21 is comprised of a cylindrical section and a hexagonal section. The cylindrical section passes through handwheel 5, journal section 30 of cylinder tail 3, input shaft seal 26, and thrust bearing 24, whereat input shaft 21 transitions to hexagonal for the remainder of its length, except for conical taper 31 at the distal end. Internal nut 22 has a hexagonal internal profile slightly larger than the external dimension of the hexagonal portion of input shaft 21. Internal nut 22 is therefore driven rotationally by input shaft 21 but can translate along its length. Internal nut 22 is torsionally and axially fixed to ACME tube 23 by radial pins 25 such that ACME tube 23 rotates with internal nut 22. ACME tube 23 is machined with a female ACME thread on its interior and the tail end of cylinder rod 12 is machined with matching male ACME thread 32. ACME tube 23 is translationally connected to piston 11 through thrust bearing 33 allowing ACME tube 23 to rotate relative to piston 11 while piston 11 can apply axial force to ACME tube 23 in either direction and vice-versa. For example, in one embodiment, a combination of precision washers in either side of thrust bearing 33 and a snap ring seated in a groove in piston 11 allows axial force to be transferred in either direction between ACME tube 23 and piston 11.

Cylinder rod 12 is prevented from rotating by the external connection made at cylinder rod end 27, therefore, rotating ACME tube 23 causes piston 11 to translate along the length of cylinder rod 12. The lead of the threads in ACME tube 23 and on cylinder rod 12 is fine enough to prevent back driving the adjustment when handwheel 5 is released. The length of the internal thread in ACME tube 23 is such that the adjustment range is equal to the entire available stroke of piston 11, therefore, the extension of cylinder rod 12 can be adjusted from zero to the full length of available travel. A typical adjustment range is zero to four inches, but longer and shorter ranges can be easily accommodated by adjusting the lengths of cylinder 1, cylinder rod 12, cylinder tail 3, input shaft 21, and ACME tube 23.

Pneumatic linear actuators are commonly used in reciprocating applications, that is, cylinder rod 12 will extend and retract, often repeatedly on a timed cycle. At the end of extension stroke 28, piston 11 will reside against cylinder nose 2. To retract cylinder rod 12, compressed air flows in through nose fitting 9 and retraction port 30 and air is exhausted through extension port 29 and tail fitting 8. This pressurizes the nose side of piston 11 forcing it to move toward cylinder tail 3. Cylinder rod 12 will continue to retract until cylinder rod end 27 contacts cylinder nose 2. Cylinder rod 12 will always fully retract but piston 11 may not contact cylinder tail 3 depending on the adjustment. The length of extension stroke 28, therefore, is dependent on the separation distance between piston 11 and cylinder nose 2 when cylinder rod 12 is retracted, and the position of piston 11 when cylinder rod 12 is retracted is dependent on the threaded engagement of ACME tube 23 relative to cylinder rod 12. To state it more succinctly, adjustment mechanism 20 changes the position of piston 11 relative to cylinder rod 12 and that controls how far cylinder rod 12 can extend. In this description, controlling the length of the extension stroke is considered to be forward acting, and a forward acting actuator always retracts fully.

An advantage of some embodiments of the invention is that the adjustment mechanism 20, other than handwheel 5 and a portion of input shaft 21, is entirely enclosed and thereby protected from a harsh environment. Cylinder 1, cylinder nose 2, and cylinder tail 3 form an enclosed interior space, with airtight seals at openings penetrated by input shaft 21 and cylinder rod 12. All of the threaded mechanisms of the adjustment mechanism 20 are positioned within the interior space, thereby being protected from the external environment. The hand wheel and a portion of the input shaft are the only portion of the adjustable stop mechanism that is exposed to the environment.

In some embodiments, a portion of adjusting mechanism 20 is exposed to the fluid media supplied through extension fitting 8 and extension port 29. When the tail side of piston 11 is exposed to elevated pressure, so are internal nut 22, acme tube 23, thrust bearing 24, radial pins 25, and thrust bearing 33. The pressurized fluid media is contained by piston barrel seal 15, piston rod seal 16, and input shaft seal 26.

Figure 4:
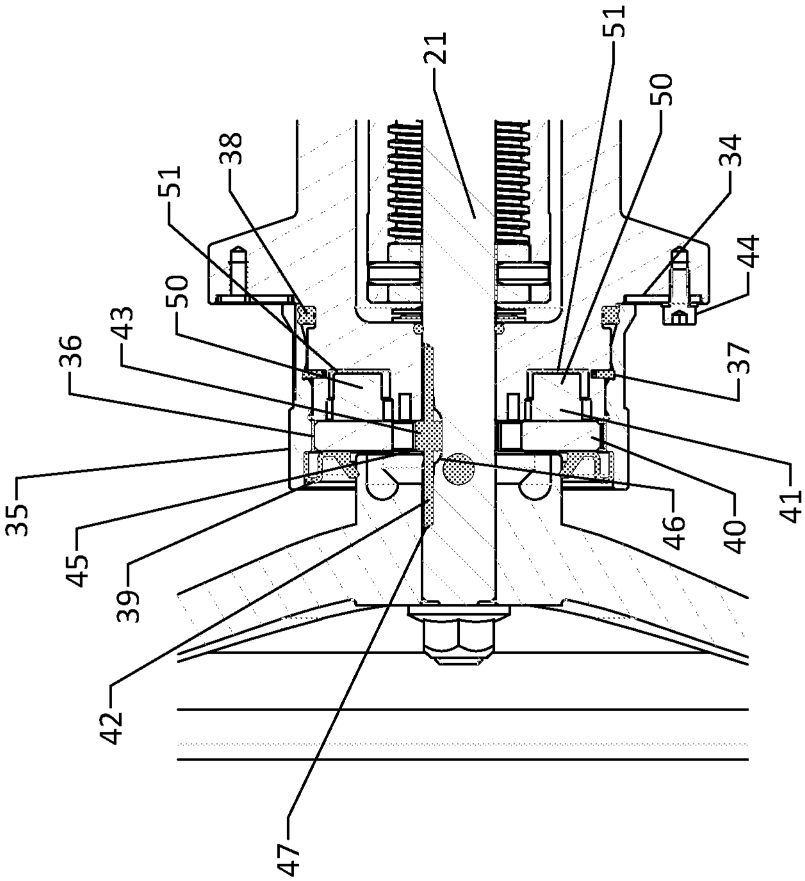
FIG. 4 is an enlarged detail from FIG. 3.
Figure 5:
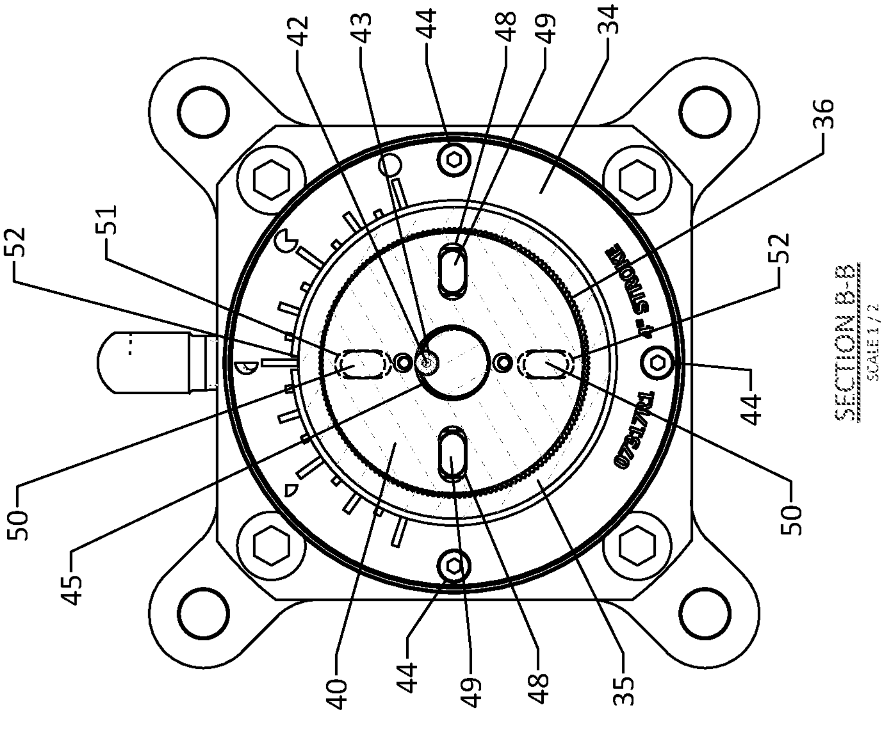
FIG. 5 is a lateral cross section at Section B-B.

It is advantageous in many applications to have a means of indicating the position of adjustment mechanism 20 and therefore the extension setting of cylinder rod 12. In the present invention adjustment mechanism 20 is completely enclosed and there are no external moving parts except handwheel 5 and cylinder rod 12. Many revolutions of handwheel 5 are required to adjust the stroke of cylinder rod 12 through its full range therefore a direct position reading of handwheel 5 is not possible. Depending on the application, the position of cylinder rod 12 may not be visible or have a means of positional reference, therefore there is no practical way to indicate the setting of the stroke length either individually or as a reference when adjusting multiple units. To solve this problem, position indicator 4 has been added utilizing a modified cycloidal gear reduction. Referring now to FIG. 4, position indicator 4 consists of indicator plate 34, indicator housing 35 with integrated internal sun gear 36, retaining ring 37, housing seal 38, handwheel seal 39, eccentric gear 40, translation disc 41, spring pin 42, roller 43, and retaining screws 44. Cycloidal gear reducers are well known in industry providing high gear ratios in a simple, compact and reliable package. The present invention uses a version of a cycloidal gear reducer in which eccentric gear 40 has external teeth, a few of which are fully or partially engaged with the teeth of internal sun gear 36. Eccentric gear 40 is forced to move in eccentric motion about input shaft 21. Eccentric gear 40 has hole 45 in its center larger than the diameter of input shaft 21, the difference being the required eccentricity. Input shaft 21 is manufactured with round bottom slot 46 into which roller 43 fits held in place by spring pin 42 fitting into slot 47 wherein spring pin 42 passes through a hole centered in roller 43. The depth of slot 47 is tapered from both ends to the middle allowing room for spring pin 42 to flex radially. The depth of slot 46 is sized to accommodate the flexure of spring pin 42 and the subsequent radial motion of roller 40 riding thereon but limited to ensure minimum engagement of the teeth on eccentric gear 40 with internal sun gear 36. Spring pin 42 takes up any manufacturing tolerances and ensures there is no play between eccentric gear 40 and input shaft 21. Eccentric gear 40 is prevented from rotating by translation disc 41, the function of which is best described referring also to FIG. 5. Eccentric gear 40 has horizontal slots 48 into which oblong projections 49 are engaged, oblong projections 49 being extended from the proximate face of translation disc 41. Horizontal slots 48 are wider than projections 49 allowing eccentric gear 40 to translate horizontally. Likewise, oblong vertical projections 50 extend from the distal face of translation disc 41 and engage vertical slots 51 in cylinder tail 3. Slots 51 are taller than projections 50 allowing eccentric gear 40 to translate vertically. Eccentric gear 40 is therefore able to translate horizontally but not rotate relative to translation disc 41, and translation disc 41 is able to translate vertically but not rotate relative to cylinder tail 3. The combination of these degrees of freedom and constraints is to allow eccentric gear 40 to travel in an eccentric path relative to input shaft 21 but without rotating. Eccentric gear 40 is forced to move eccentrically by roller 43 as roller 43 revolves with input shaft 21. The gear ratio is given by the formula $w2/w1=-(P-S)/S$ where $w2/w1$ is the ratio of the angular speeds of the two gears, P is the number of teeth on eccentric gear 40 and S is the number of teeth on internal sun gear 36. In this embodiment of the present invention, internal sun gear 36 has 160 teeth and eccentric gear 40 has 158 teeth therefore the gear reduction is $-(158-160)/160)=0.0125$ or inversely, an 80:1 gear reduction. Full adjustment of the stroke requires 32 turns of handwheel 5 therefore the minimum gear ratio is 32:1 but in the present invention indicator housing 35 travels $32/80=0.40$ of one revolution or $360\times0.40=144$ degrees lock to lock. Indicator housing 35 is manufactured with notch 52 that indicates the stroke setting by reference to indicator plate 34. Indicator plate 34 is mounted by screws 44 enabling indicator plate 34 to be reversed or substituted with a different range depending on the application and/or maximum stroke of cylinder rod 12. A notable feature of position indicator 4 is that indicator housing 35 rotates in the same direction as handwheel 5. This is instructive for determining which direction to turn the handle. The present invention is intended for use in harsh environments such as actuating port dampers on recovery boilers as described in reference U.S. Pat. No. 5,307,745. To prevent contaminants from entering position indicator 4 and adjusting mechanism 20, elastomeric handwheel seal 39 is fitted between indicator housing 35 and handwheel 5; and elastomeric housing seal 38 is fitted between indicator housing 35 and cylinder tail 3. Both handwheel seal 39 and housing seal 38 are off-the-shelf ring seals, of which, many types and styles are available and applicable.

Figure 6:
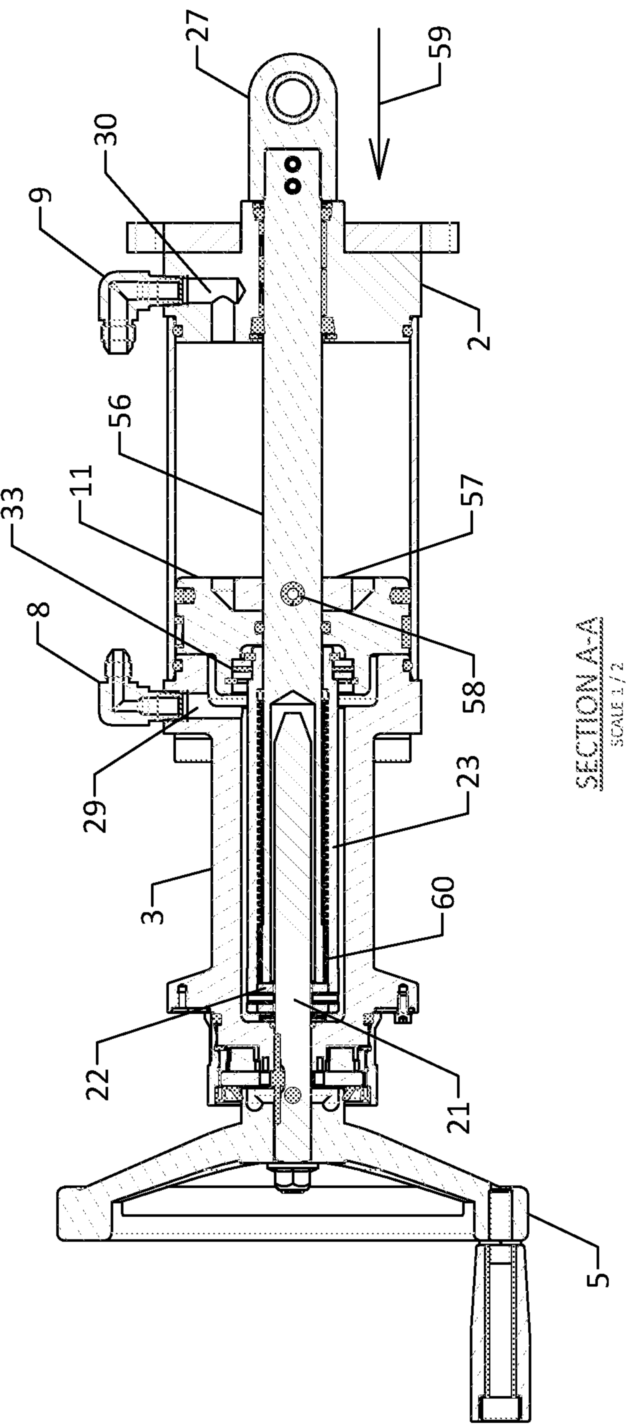
FIG. 6 is a longitudinal cross section of a second embodiment at Section A-A. of FIG. 1

A second embodiment of the present invention is described with reference to FIG. 6. The second embodiment is identical to the first embodiment with the exceptions that cylinder rod 12 has been replaced with elongated cylinder rod 56 and stop collar 57 is fixed to cylinder rod 56 by pin 58. Otherwise the same reference numbers are used in this description as in the first embodiment. This embodiment is considered reverse acting because cylinder rod 56 always extends fully but retraction stroke 59 is adjustable as opposed to the forward acting version described in the first embodiment in which cylinder rod 12 always retracts fully and extension stroke 28 is adjustable. Referring to FIG. 6, the second embodiment is shown in the fully retracted position. Cylinder rod 56 is elongated such that male ACME threads 60 are against internal nut 22 when stop collar 57 is against piston 11. When adjusted for and fully retracted, piston 11 is against cylinder tail 3 and cylinder rod end 27 is against cylinder nose 2. Rotating handwheel 5 rotates input shaft 21, internal nut 22, and ACME tube 23. ACME tube 23 is free to rotate relative to piston 11 but fixed to piston 11 translationally by thrust bearing 33. Cylinder rod 56 is prevented from rotating by the external connection made at cylinder rod end 27, therefore, rotating ACME tube 23 translates cylinder rod 56 axially relative to ACME tube 23 and piston 11. This moves cylinder rod 56 toward cylinder nose 2 introducing a gap between stop collar 57 and piston 11. When a gap exists between piston 11 and stop collar 57 the retraction stroke is limited because piston 11 will contact cylinder tail 3 before cylinder rod end 27 contacts cylinder nose 2. Converting the first embodiment to the second embodiment is simply accomplished by substituting cylinder rod 56 for cylinder rod 12 and adding stop collar 57 and pin 58.

Two embodiments of the present invention have been described but it will be apparent to one skilled in the art that many variations are possible that fall within the scope of the invention.

Some embodiment comprise an adjustable stop mechanism, embodiments of which are described above. Some embodiments comprise a linear actuator that incorporates the adjustable stop mechanisms. Some embodiments comprise a linear actuator that can be converted from a forward-acting adjustable linear actuator to a reverse-acting adjustable linear actuator, such as by the replacement of a piston rod and addition of an adjustable stop. Some embodiments comprise a method of converting a forward-acting adjustable linear actuator to a reverse-acting adjustable linear actuator.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A fluid-powered linear actuator comprised of:
a cylinder,
a piston slidably sealed to an interior of said cylinder,
a first end cover statically sealed to an end of said cylinder,
a second end cover statically sealed to the end of said cylinder opposite said first end cover,
a rod connected to said piston and adjustable axially and slidably sealed thereto, said rod passing through one of said end covers and slidably sealed therethrough, said rod capable of translating through a maximum stroke length, and
an internally threaded tube rotatably and coaxially connected to said piston, said internal threads engaged with matching external threads on said rod in which rotation of said tube relative to said rod adjusts the axial position of said piston relative to said rod, said internally threaded tube being slidably connected to a coaxial input shaft, said input shaft being the means by which torque is applied to said internally threaded tube about its axis,
thereby providing an adjustable mechanism in which said stroke length is shortened by adjustment of said mechanism, and said adjustable mechanism is coaxial with said rod.

2. The fluid-powered linear actuator of claim 1, in which said input shaft is coaxial with said rod and telescopes inside at least a portion of said rod.

3. A fluid-powered linear actuator comprised of:
a cylinder,
a piston slidably sealed to an interior of said cylinder,
a first end cover statically sealed to an end of said cylinder,
a second end cover statically sealed to the end of said cylinder opposite said first end cover,
a rod connected to said piston and adjustable axially and slidably sealed thereto, said rod passing through one of said end covers and slidably sealed therethrough, said rod capable of translating through a maximum stroke length, in which rotation of said rod is prevented by connection of said rod to an external mechanism being actuated, and
an internally threaded tube rotatably and coaxially connected to said piston, said internal threads engaged with matching external threads on said rod in which rotation of said tube relative to said rod adjusts the axial position of said piston relative to said rod,
thereby providing an adjustable mechanism in which said stroke length is shortened by adjustment of said mechanism, and said adjustable mechanism is coaxial with said rod.

4. A fluid-powered linear actuator comprised of:
a cylinder,
a piston slidably sealed to an interior of said cylinder,
a first end cover statically sealed to an end of said cylinder,
a second end cover statically sealed to an end of said cylinder opposite said first end cover,
a rod connected to said piston and adjustable axially and slidably sealed thereto, said rod passing through one of said end covers and slidably sealed therethrough, said rod capable of translating through a maximum stroke length, in which said input shaft is coaxial with said rod and telescopes inside at least a portion of said rod, and
an internally threaded tube rotatably and coaxially connected to said piston, said internal threads engaged with matching external threads on said rod in which rotation of said tube relative to said rod adjusts the axial position of said piston relative to said rod;
thereby providing an adjustable mechanism in which said stroke length is shortened by adjustment of said mechanism, and said adjustable mechanism is coaxial with said rod.

5. The fluid-powered linear actuator of claim 4, in which said adjustment of said mechanism is made by altering the engagement of an internally threaded component with an externally threaded component, wherein said internally threaded component and said externally threaded component are exposed to a fluid media used to actuate said fluid-powered linear actuator.

6. The fluid-powered linear actuator of claim 4, in which the stroke length of said piston in the direction of said end cover through which said rod passes is reduced from said maximum stroke length by said adjustable mechanism.

7. The fluid-powered linear actuator of claim 4, in which the stroke length of said piston in the opposite direction of said end cover through which said rod passes is reduced from said maximum stroke length by said adjustable mechanism.

8. The fluid-powered linear actuator of claim 4, in which the axial position of said piston on said rod is controlled by said adjustable mechanism.

9. The fluid-powered linear actuator of any of claim 4, further comprising a stop collar axially fixed to said rod in which said adjustment mechanism changes the separation distance between said stop collar and said piston from zero to said maximum stroke length.

10. The fluid-powered linear actuator of claim 4, in which said adjusting mechanism is coaxially housed in one of said end covers.

11. The fluid-powered linear actuator of any of claim 4, in which said input shaft actuates a coaxial position indicator through a gear reducer of at least 32:1 gear ratio.

12. The fluid-powered linear actuator of claim 11, in which a cycloid type gear train is used to create the required gear reduction.

13. The fluid-powered linear actuator of claim 11, in which said position indicator incorporates a coaxial internal sun gear in meshed contact with an eccentric gear, said eccentric gear following a circular path eccentric to said input shaft but without rotation relative to the input shaft, said eccentric gear driven by the rotation of said input shaft.

14. The fluid-powered linear actuator of claim 11, in which said input shaft is rotationally driven by a handwheel and said position indicator is sealed to said handwheel by an elastomeric seal.

15. The fluid-powered linear actuator of claim 11, in which said position indicator is coaxially journaled on one of said end covers and sealed thereto by an elastomeric seal.

* * * * *